United States Patent
Pope

(10) Patent No.: US 7,373,118 B1
(45) Date of Patent: May 13, 2008

(54) METHOD AND SYSTEM FOR FACILITATING TRANSMISSION OF ANALOG SIGNALS TO A WIRELESS TERMINAL

(75) Inventor: John Pope, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 666 days.

(21) Appl. No.: 10/609,173

(22) Filed: Jun. 27, 2003

(51) Int. Cl.
*H01Q 11/12* (2006.01)

(52) U.S. Cl. .............................. 455/127.1; 455/127.2; 455/456.5; 455/524; 375/295; 375/297

(58) Field of Classification Search ............ 455/456.5, 455/524, 556, 561, 552.1, 553.1, 127, 127.1, 455/127.2, 127.3, 127.4, 127.5; 370/342, 370/320, 335, 441; 375/295, 297
See application file for complete search history.

(56) References Cited

U.S. PATENT DOCUMENTS 6,781,980 B1 *  8/2004  Dajer et al. ................. 370/342
2002/0191676 A1 * 12/2002  Kenneth ..................... 375/130
2003/0114124 A1 *  6/2003  Higuchi ...................... 455/126
2004/0047309 A1 *  3/2004  Barnes ........................ 370/329
2005/0215245 A1 *  9/2005  Tian et al. ................ 455/422.1

\* cited by examiner

*Primary Examiner*—Nay Maung
*Assistant Examiner*—Dominic E. Rego

(57) ABSTRACT

A wireless network may have a digital base station and a radio link converter unit. The digital base station may receive bearer data for each of a plurality of channels, establish control information for each of the plurality of channels, and output a digital signal that defines the bearer data and the control information. The radio link converter may receive the digital signal and extract from the control information, for instance, a power level for each of the plurality of channels and a modulation frequency. Based on the power level and the modulation frequency, the radio link converter may responsively generate an analog signal having a plurality of analog channels that defines the bearer data in the digital signal. The radio link converter may then output the analog signal to an antenna for transmission to a wireless terminal.

10 Claims, 5 Drawing Sheets

METHOD AND SYSTEM FOR FACILITATING TRANSMISSION OF ANALOG SIGNALS TO A WIRELESS TERMINAL

BACKGROUND

1. Field of the Invention

This invention relates to telecommunications services and more particularly to a method and system for facilitating transmission of analog signals to a wireless terminal.

2. Description of Related Art

A wireless terminal is a form of telecommunication technology that enables people to communicate with others. The wireless terminal can take a variety of forms. The wireless terminal may be, for example, a cellular phone, a pager, a personal digital assistant (PDA), a portable computer with wireless modem, or a fixed wireless terminal.

The wireless terminal exchanges signals with a radio access network. The radio access network communicatively couples the wireless terminal to a remote terminal. The remote terminal may be, for example, another cellular telephone, a pager, a PDA, a portable computer with wireless modem, or a fixed wireless terminal.

The radio access network typically has a base transceiver station (BTS) and a base station controller (BSC) (collectively referred to as a "base station"). The wireless terminal exchanges signals with the BTS and the BSC. The radio access network may also have a mobile switching center (MSC), an interworking function (IWF), and an IP network. The BSC may be coupled to the MSC, which is in turn coupled to the IWF and IP network. Additionally, the radio access network may have a BSC coupled to a packet data serving node (PDSN) and the IP network. Therefore, the radio access network facilitates wireless communication with the IP network.

The base station has a basic architecture that consists of radio-frequency (RF) power amplifier, a radio frequency section, a sampling and reconstruction system, and a signal processing system. The RF power amplifier, radio frequency section, sampling and reconstruction system, and signal processing system collectively facilitate exchange of signals with the wireless terminal.

In a transmit mode, the base station receives a digital signal from the MSC or the PDSN and transmits an analog signal to the wireless terminal. The digital signal may be defined by a plurality of channels. The signal processing system amplifies each channel of the digital signal to a power level. Then, the digital signal is passed to the sampling and reconstruction system. The sampling and reconstruction system has a digital-to-analog converter (DAC) that converts the digital signal from the MSC or the PDSN into the analog signal. A plurality of channels, typically 128 channels in a carrier division multiple access (CDMA) protocol, may define the analog signal. The radio frequency section modulates the analog signal at a modulation frequency. Finally, the RF power amplifier adds a fixed gain to the analog signal and outputs the analog signal to an antenna for transmission to the wireless terminal.

In a receive mode, the base station receives an analog signal from the wireless terminal and outputs a digital signal to the MSC or to the PDSN. The RF power amplifier receives the analog signal at the antenna. The RF power amplifier adds a fixed gain to the analog signal and the radio frequency section demodulates the analog signal to a base band signal. The sampling and reconstruction system has an analog-to-digital converter (ADC). The ADC converts the base band signal into a digital signal and outputs the digital signal to the MSC or to the PDSN.

This basic architecture allows for the base station to transmit and receive signals with the wireless terminal.

SUMMARY

In the transmit mode, a base station is designed to convert a digital signal from the MSC or the PDSN into an analog signal and transmit the analog signal to the wireless terminal. Existing wireless network have a plurality of base stations. Each base station is designed to amplify channels of the digital signal to particular power levels and modulate the analog signal to a particular modulation frequency. Therefore, a digital signal to be converted into an analog signal must be sent to one of the plurality of base stations in the wireless network capable of appropriately converting the digital signal into the analog signal.

In accordance with an exemplary embodiment of the present invention, a wireless network may have a digital base station and a radio link converter unit. The digital base station may receive bearer data for each of a plurality of channels and output to the radio link converter unit the bearer data along with control information. The control information may define, among other information, a power level for each channel and a modulation frequency. The radio link converter may responsively generate an analog signal that defines the plurality of channels of bearer data received from the digital base station. Each channel of the analog signal may have the power level defined by the control information for the channel. Also, the analog signal may be modulated at the modulation frequency defined by the control information for the analog signal. The radio link converter may then output the analog signal to an antenna for transmission to a wireless terminal.

Advantageously, the digital base station and radio link converter unit can collectively perform the function of a plurality of base stations that each modulate an analog signal at a particular modulation frequency and define channels of the analog signal that have particular power levels. A wireless network with a digital base station and radio link converter unit might not need as many network elements to modulate an analog signal and amplify channels of the analog signal. Instead, the digital base station and radio link converter unit, themselves, can function to amplify and modulate signals to a plurality of power levels and a plurality of modulation frequencies.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
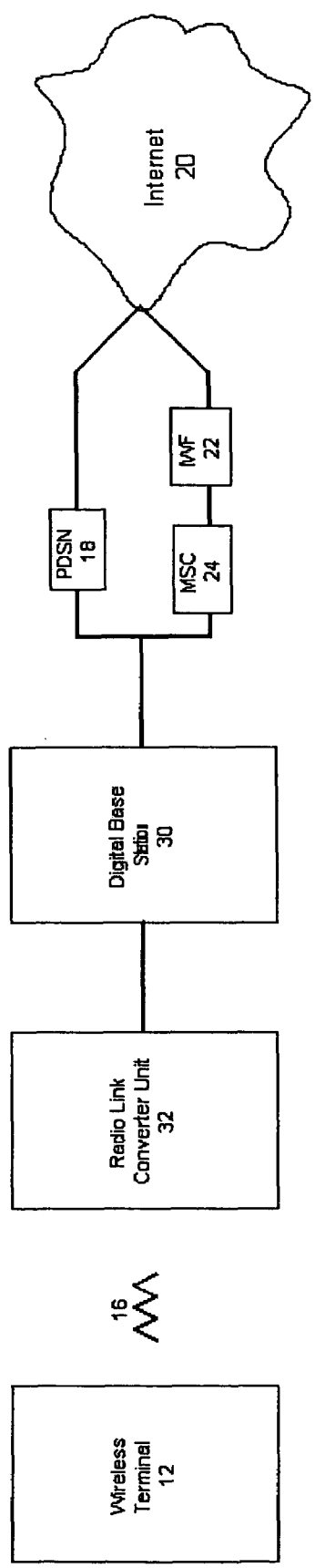
FIG. 1 is a block diagram of an exemplary wireless network in which exemplary embodiments of the present invention may be employed.

FIG. 1 is a block diagram of a wireless network in which exemplary embodiments of the present invention may be employed. It should be understood that this and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location. Moreover, the various functions described herein as being performed by one or more entities may be carried out by hardware or by a processor programmed to execute an appropriate set of computer instructions stored in memory. Provided with the present disclosure, those skilled in the art can readily design the hardware or prepare the appropriate set of computer instructions (e.g., software) to perform such functions.

By way of example, the wireless network may include a wireless terminal 12 and a radio link converter unit 32, separated by an air interface 16. The wireless terminal may be, for example, a cellular phone, a pager, a PDA, a portable computer with wireless modem, or a fixed wireless device. The radio link converter unit 32 may produce a radiation pattern that defines a coverage area for the wireless terminal 12. The radiation pattern may facilitate communication between the wireless terminal 12 and the radio link converter unit 32 that conforms to well known standards such as Interim Standard (IS) 95, IS-2000, or Global System for Mobile Communication (GSM) protocol, as well as other standards now known or later developed.

The wireless network may also include a digital base station 30, MSC 24, IWF 22, and PDSN 18. The radio link converter unit 32 may be coupled to the digital base station 30. The digital base station 30 may facilitate exchange of signals between the radio link converter unit 32 and the MSC 24 and/or PDSN 18. The MSC 24, in turn, may be coupled to the IWF 22 and the Internet 20. Additionally, the PDSN 18 may be coupled to the Internet 20. The IWF 22 and PDSN 18 may facilitate communication between the wireless terminal 12 and the Internet 20. The Internet 20 may be a collection of terminals that are networked together. The terminals may take the form of computers, but of course other arrangements are also possible.

Figure 2:
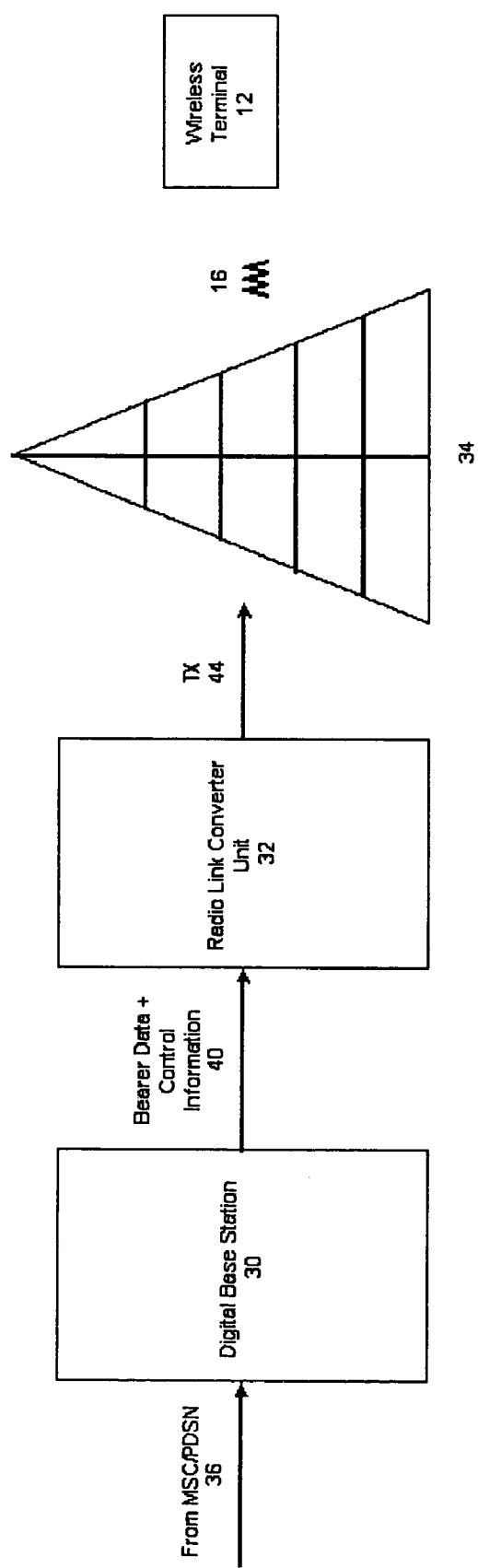
FIG. 2 is a block diagram that illustrates communication between a digital base station and a radio link converter unit.

FIG. 2 illustrates, in more detail, communication between the digital base station 30 and the radio link converter unit 32. The digital base station 30 and the radio link converter unit 32 may be co-located on a single platform. Alternatively, the digital base station and the radio link converter unit 32 may be physically separated, such that the radio link converter unit is located in proximity to an antenna 34 and the digital base station 30 is located in proximity to the MSC 24 or the PDSN 18 of the wireless network. Other arrangements are also possible.

The digital base station 30 and the radio link converter unit 32 may be arranged to receive signals from the MSC 18 and PDSN 24 and transmit signals to the wireless terminal 12. Link 36 may communicatively couple the MSC 18 or the PDSN 24 to the digital base station 30. The digital base station 30 may receive bearer data from link 36. The bearer data may be web content, voice communications, e-mails, instant messages, or any other type of data typically transmitted to the wireless terminal 12 from the MSC 18 or the PDSN 24. The bearer data may be received at a rate of 19.2 kilobits/second per channel or some other data rate depending on type of the bearer data. The digital base station 30 may output the bearer data along with control information to the radio link converter unit 32, over link 40. Using the control information, the radio link converter unit 32 may generate analog signals defining the bearer data. Then, the radio link converter unit 32 may output the analog signals to link 44 and to an antenna 34, for transmission to the wireless terminal 12 over the air interface 16.

The control information that the digital base station 30 sends to the radio link converter unit 32 may define the format of the analog signal to be generated by the radio link converter unit 32. For instance, the digital base station 30 may define one or more of the following in the control information: (i) a modulation frequency at which the analog signal is to be modulated (ii); a power level at which a channel of the analog signal is to be amplified; (iii) a spreading sequence, such as a Walsh code, Gold code, or some other code now known or later developed for spreading a digital signal that defines the bearer data into a spread spectrum signal; and (iv) a PN (pseudorandom-noise) offset to isolate users operating on a same frequency in different sectors of the wireless network.

The control information may define other signal characteristics, instead of or in addition to those described here. Also, the control information, itself, might not define all of the types of characteristics described above. Instead, the modulation frequency for the analog signal, the power level for each channel, the spreading sequence, and/or the PN offset may be programmed directly into the radio link converter unit 32. As a result, the digital base station 30 might not have to send such control information to the radio link layer converter unit 32.

The signals transmitted over link 40 may take the form of a time-division multiplexed signal. Each time slot may define bearer data and control information for an analog signal to be transmitted over the air interface 16.

Figure 3:
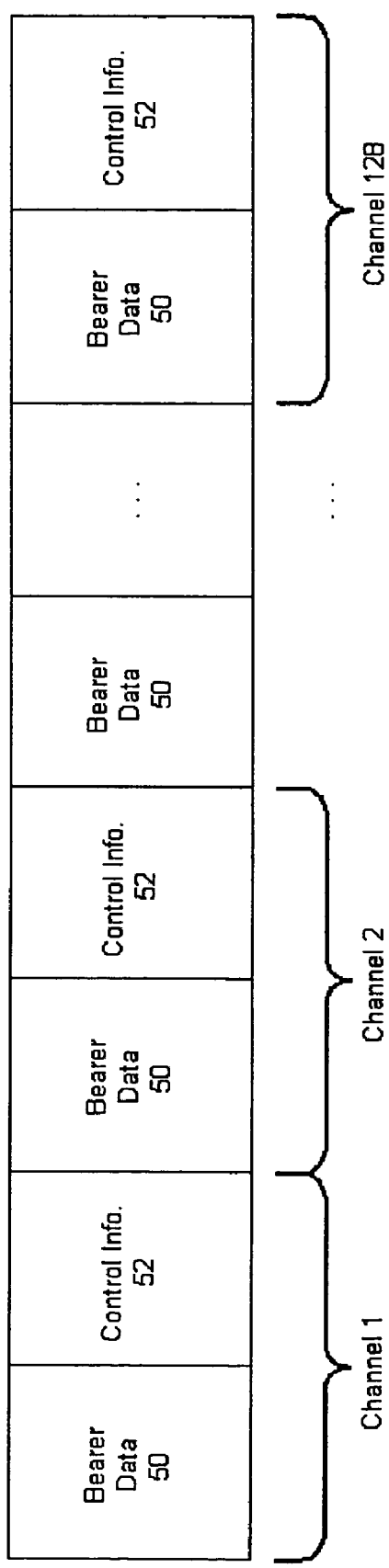
FIG. 3 illustrates a frame that the digital base station may send to the radio link converter unit to define bearer data and control information.

FIG. 3 illustrates an exemplary frame that the digital base station 30 may send over link 40 to the radio link converter unit 32 to define bearer data and control information. The frame may be sub-divided into a plurality of fields 50, 52. The fields 50 may define the bearer data to be sent over a path of communication, i.e., channel, to a wireless terminal. The frame may allow for defining bearer data for 128 separate channels. Additionally, the fields 52 may define the control information associated with each of the channels of bearer data.

Other variations are also possible for representing the bearer data and control information sent by the digital base station 30 to the radio link converter unit 32. The bearer data and the control information, for instance, may be integrated together, rather than being located in regular fields 50, 52. Alternatively, the signals transmitted over link 40 make take the form of packets. The control information and the bearer data may be defined in a packet having a header and a payload. The header may define the control information associated with the channels of the analog signal and the payload may define the bearer data for the channels. The exemplary embodiments of the present invention are in no way limited by how the bearer data and the control information are sent over the link 40.

Figure 4:
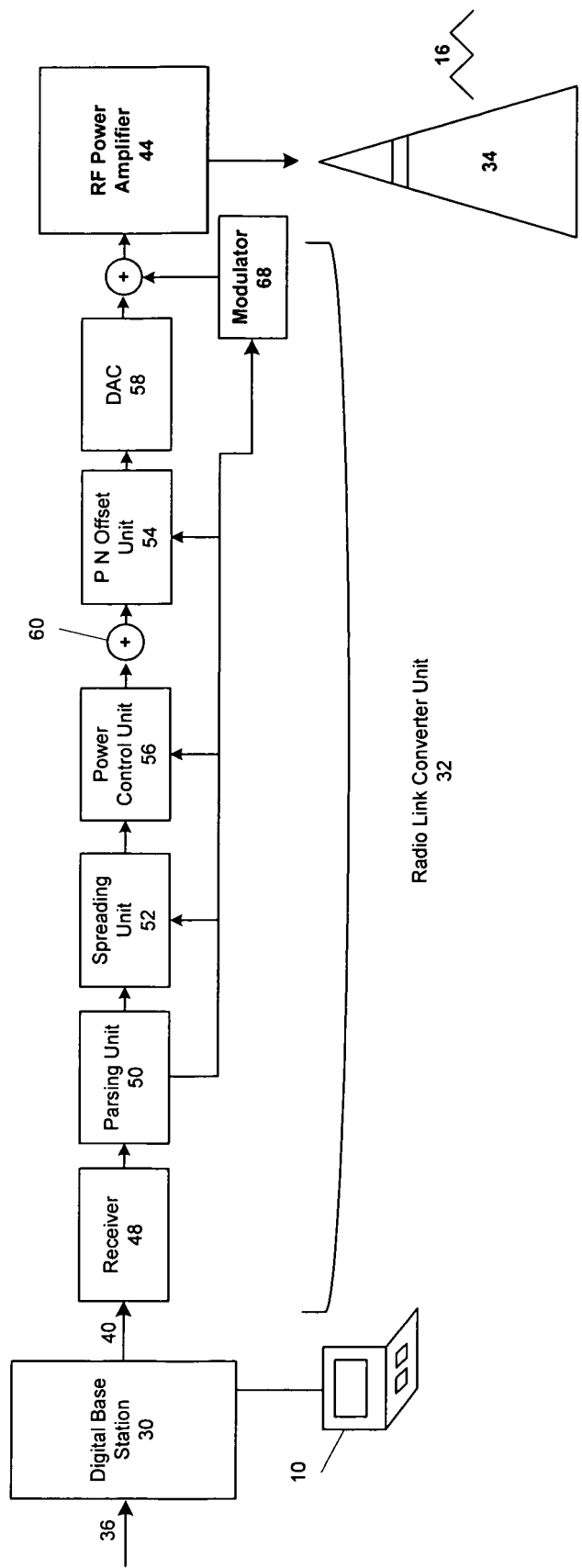
FIG. 4 illustrates processing modules for generating an analog signal that is transmitted to at least one wireless terminal.

FIG. 4 illustrates processing modules for generating the analog signal transmitted to the wireless terminal 12. The processing modules 48, 50, 52, 56, 60, 54, 58, 68, may define exemplary functionality of the radio link converter unit 32. Other arrangements, however, are also possible. Functionality illustrated as part of the radio link converter unit 32 may be, for instance, integrated into the digital base station 30. Additionally or alternatively, the radio link converter unit 32 may have functionality in addition to or instead of what is described. The processing modules that make up the radio link converter unit 32 are not limited to what is illustrated by FIG. 4.

The digital base station 30 may have a processor and memory. The memory may store computer instructions executable by the processor for receiving from link 36, bearer data for a plurality of channels. The memory may also store computer instructions executable by the processor to define a data frame, such as illustrated by FIG. 3. The digital base station 30 may be programmed to insert into the data frame, the control information and the bearer data for the plurality of channels, and output the data frame to the radio control unit 32 over the link 40.

A user interface 10 coupled to the digital base station 30 may facilitate obtaining the control information associated with the bearer data. The user interface 10 may consist of a keyboard or some other mechanism for allowing a user to input into the digital base station 30 a modulation frequency at which the analog signal generated by the radio link converter unit 32 is to be modulated and a power level at which a channel is to be modulated. Also, the user may be able to input a spreading sequence for a channel, and/or a PN offset for a cell. The digital base station 30 may use the control information obtained by the user interface 10 to define the frame sent to the radio link converter unit 32. Other arrangements are also possible.

The radio link converter unit 32 may generate an analog signal consisting of receiver 48, a parsing unit 50, a spreading unit 52, a power control unit 56, a PN offset unit 54, a DAC 58, a modulator 68, a RF power amplifier 44, and an antenna 34.

The receiver 48 may receive the control information and the bearer data from link 40. The receiver 48 may send the bearer data and the control information to the parsing unit 50. The parsing unit 50 may extract, from the data frame sent by the digital base station 30, the bearer data for a particular channel and the control information for the particular channel. The control information may define the power level for the particular channel of bearer data, the modulation frequency for the particular channel of bearer data, the spreading sequence for the particular channel, and the PN offset. Then, the parsing unit 50 may send the bearer data for the particular channel to the spreading unit 32, the power level for the particular channel to the power control unit 56, the modulation frequency for the particular channel to the modulator 68, the spreading sequence for the particular channel to the spreading unit 52, and the PN offset to the PN offset unit 54.

The bearer data that the parsing unit 50 sends to the spreading unit 52 for each channel may take the form of a digital signal. The spreading unit 52 may spread the digital signal for each channel to produce a spread spectrum signal for each channel. The spread spectrum signal may have a bandwidth greater than a bandwidth of the digital signal. The spread spectrum signal for each channel may have a data rate of 1.228 mega-chips/second, but other arrangements are also possible depending on a spreading sequence applied.

The spreading sequence that is applied to the digital signal for each channel may be the spreading sequence that is extracted from the control information by the parsing unit 50. The spreading unit 52 may apply the spreading sequence to each channel of the digital signal to produce a plurality of spread spectrum signals.

The power control unit 56 may amplify each of the spread spectrum signals to the power level defined by the control information for the channel. The power level applied to the channel may be the power level that is extracted from the control information by the parsing unit 50. Next, an adder 60 may then sum each spread spectrum signals and the PN offset unit 54 may multiply a PN offset to the sum of spread spectrum signals. The PN offset applied may be that which is extracted from the control information by the parsing unit 50.

The DAC 58 may then convert the sum of the spread spectrum signals into an analog signal to be transmitted to a wireless terminal. The analog signal may define the plurality of channels of bearer data.

Prior to transmitting the analog signal, the modulator 68 may modulate the analog signal. The analog signal may be modulated at the modulation frequency defined by the control information. For example, the modulator 68 may produce a carrier wave at the modulation frequency defined by the control information. The radio frequency modulator 68 may multiply the carrier wave with the analog signal so as to modulate the particular channel of the analog signal at the modulation frequency.

Alternatively, the analog signal may be modulated as two or more steps. The modulation frequency may be known as an intermediate frequency (IF). The modulator 68 may first multiply the analog signal by an intermediate frequency (IF) wave at the modulation frequency. The result of multiplying the analog signal by the IF wave may be to modulate the analog signal at the modulation frequency. Then, the modulator 68 may multiply the analog signal, modulated at the intermediate frequency, by another wave. The other wave may be at a carrier frequency that results in the particular channel of the analog signal being further modulated to a higher frequency. With the analog signal modulated at the carrier frequency, the RF power amplifier 44 may add a fixed gain to the analog signal. Then, the analog signal may be output to the antenna 34 for transmission to the wireless terminal 12.

Other arrangements are also possible for producing the analog signal. The processing illustrated by FIG. 4 is exemplary in nature. The processing may be organized in an order different from that which is described. Additionally, the processing performed by the digital base station 30 and the radio control unit 32 may depend on a format of the analog signal to be transmitted to the wireless terminal 12.

Figure 5:
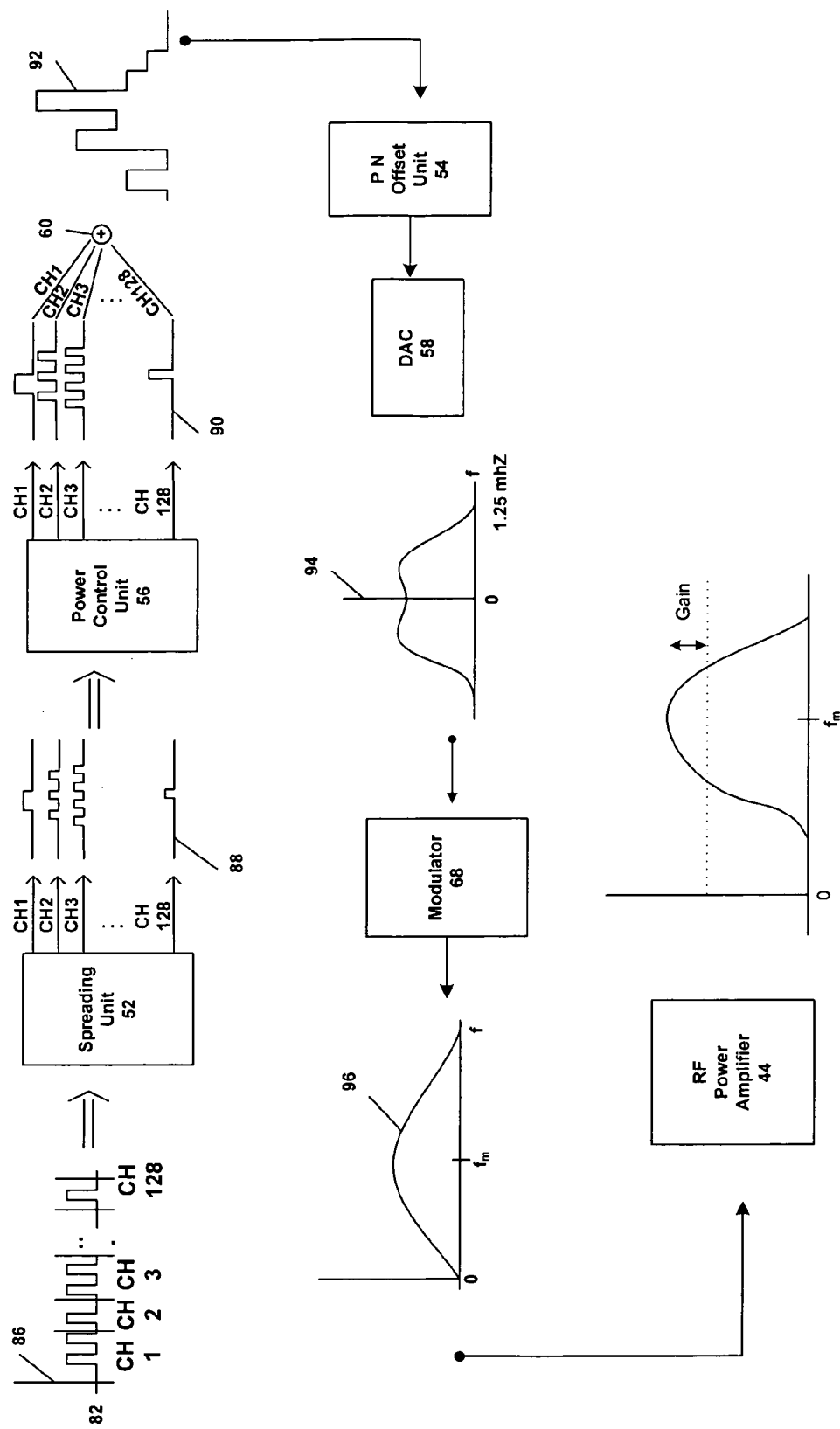
FIG. 5 illustrates exemplary digital signal processing and exemplary analog signal processing performed by processing modules of the radio link converter unit.

FIG. 5 illustrates exemplary digital signal processing and exemplary analog signal processing performed by the processing modules of the radio link converter unit 32.

As described above, the receiver 48 of the radio link converter unit 32 may receive from link 40 data frames that define bearer data and control information for a plurality of channels. The receiver 48 may pass the data frames to the parsing unit 50. In turn, the parsing unit 50 may output a digital signal 82 to the spreading unit 52. The digital signal 82 may define the bearer data for the plurality of channels. The bearer data for a particular channel may be encoded in an interval 86. Thus, the digital signal 82 may be defined by a plurality of intervals 86.

The digital signal 82 may take other forms consistent with the exemplary embodiment of the present invention. For example, the digital signal 82 may take the form of in-phase (I) and quadrature phase (Q) components. The I and Q components may be orthogonal signals that are processed separately by the spreading unit 52, the power control unit 56, the summer 60, the PN offset unit 54, the DAC 58, and the modulator 68. The modulator 68 may apply to the I and Q components, a wave modulated at the modulation frequency defined by the control information. The wave applied to the I component may be in-phase and the wave applied to the Q component may be quadrature-phase. Then, the modulator 68 may sum the modulated in-phase component and modulated out-of-phase component to produce the analog signal. Other arrangements are also possible consistent with the exemplary embodiments of the present invention.

The digital signal 82 may be passed to the spreading unit 52. The spreading unit 52 may apply the spreading sequence to each channel of the digital signal 82. By applying the spreading sequence to each channel of the digital signal 82, the spreading unit 52 may produce one or more spread spectrum signals 88. The one or more spread spectrum signals 88 may define, albeit in a spread spectrum form, the bearer data for the one or more channels.

The spread spectrum signals 88 may then be input into the power control unit 56. The power control unit 56 may have received from the parsing unit 50 a power level for each channel of bearer data. The power level may be an absolute or differential power level for the channel of bearer data. The power control unit 56 may use the power level to amplify the power of the spread spectrum signal 88 for each channel to the power level. For example, the power control unit 56 may receive from the parsing unit 50 an indication that channel 1 is to be amplified to 10 dBm and channel 2 is to be amplified to 20 dBm. The power control unit 56 may use the indications to amplify the spread spectrum signals 88 to produce the spread spectrum signals 90 with the appropriate power levels. Other arrangements are also possible.

An adder 60 may then sum the spread spectrum signals 90 output by the power control unit 56 to produce signal 92 input into the PN offset unit 54. The PN offset unit 54 may add a PN offset to the signal 92. Then, the DAC 58 may convert the signal 92 into an analog signal 94.

The DAC 58 may convert the spread spectrum signal 92 into the analog signal 94. The DAC 58 may convert the spread spectrum signal 92 into the analog signal so that each channel of the analog signal 94 has the power level defined by the control information. The analog signal may have a bandwidth of 1.25 MHz and define the 128 analog channels of bearer data, but other arrangements are also possible depending on the format of the analog signal. The modulation unit 68 may then modulate the analog signal 94 to produce a modulated analog signal 96. The modulation unit 68 may modulate the analog signal at the modulation frequency, $f_m$, defined by the control information. The modulation frequency may be a frequency between 1850 MHz to 1990 MHz for CDMA protocol, but other arrangements are also possible.

The RF power amplifier 44 may then add a fixed gain to the analog signal. Then, the radio control unit 32 may transmit the analog signal at the antenna 34 to at least one wireless terminal.

Exemplary embodiments have thus been illustrated and described. It will be understood, however, that changes and modifications may be made to the exemplary embodiments without deviating from the spirit and scope of the invention, as defined by the following claims.

I claim:

1. In a wireless network, a method for transmitting analog signals to at least one wireless terminal, the method comprising:

receiving a digital signal that defines (i) bearer data for each of a plurality of channels; and (ii) control information for each of the plurality of channels;

parsing from the control information, a power level and a modulation frequency, the power level being one of a plurality of possible power levels and the modulation frequency being one of a plurality of possible modulation frequencies;

based on the power level and the modulation frequency, responsively generating an analog signal having a plurality of analog channels that defines the bearer data in the digital signal; and transmitting the analog signal to the at least one wireless terminal.

2. The method of claim 1, wherein responsively generating the analog signal comprises:

applying a spreading sequence to each channel of bearer data in the digital signal to produce a spread spectrum signal for each channel of bearer data;

amplifying the spread spectrum signal for each channel of bearer data to the power level defined by the control information for the channel;

adding the spread spectrum signal for each channel of bearer data to produce a sum of spread spectrum signals;

converting the sum of the spread spectrum signals into the analog signal; and modulating the analog signal to the modulation frequency defined by the control information.

3. The method of claim 2, wherein the spreading sequence is selected from the group consisting of a Walsh code and a Gold code.

4. The method of claim 1, wherein the control information further comprises a spreading sequence and a PN offset.

5. In a wireless network, a system for transmitting analog signals to at least one wireless terminal, the system comprising:

a receiver arranged to receive a digital signal that defines (i) bearer data for each of a plurality of channels; and (ii) control information for each of the plurality of channels;

a parser arranged to parse from the control information, a power level and a modulation frequency, the power level being one of a plurality of possible power levels and the modulation frequency being one of a plurality of possible modulation frequencies;

means for responsively generating, based on the power level and the modulation frequency, an analog signal having a plurality of analog channels that defines the bearer data in the digital signal; and an RF power amplifier arranged to transmit the analog signal to the at least one wireless terminal.

6. The system of claim 5, wherein the control information further comprises a spreading sequence and a PN offset.

7. In a wireless network, a system for transmitting analog signals to at least one wireless terminal, the system comprising:

a receiver arranged to receive a digital signal that defines (i) bearer data for each of a plurality of channels; and (ii) control information for each of the plurality of channels;

a parser arranged to extract from the control information, a power level and a modulation frequency, the power level being one of a plurality of possible power levels and the modulation frequency being one of a plurality of possible modulation frequencies;

a spreading unit arranged to define, for each of the plurality of channels, a spread spectrum signal;

a power control unit arranged to amplify the spread spectrum signal for each of the plurality of channels, the spread spectrum signal being amplified to the power level defined by the control information for the channel;

an adder arranged to sum the spread spectrum signal for each channel to produce a sum of spread spectrum signals;

a digital-to-analog converter arranged to convert the sum of the spread spectrum signals into an analog signal;

a modulator arranged to modulate the analog signal to the modulation frequency defined by the control information; and an RF power amplifier arranged to transmit the analog signal to the at least one wireless terminal.

8. The system of claim 7, wherein (i) the control information includes a spreading sequence for each channel of the digital signal; and (ii) the spreading unit is further arranged to apply to each channel of the digital signal the spreading sequence.

9. The system of claim 7, wherein the control information includes a PN offset for the analog signal, the system further comprising a PN offset unit arranged to apply to the sum of spread spectrum signals the PN offset.

10. A system comprising:
a digital base station;
a radio link converter unit;
wherein the digital base station is communicatively coupled to the radio link converter unit;

the digital base station arranged to:
receive bearer data for a plurality of channels;
establish (i) a modulation frequency for an analog signal that is to define the bearer data for the plurality of channels; and (ii) a power level for each channel of bearer data; and
output to the radio link converter unit, a digital signal defining (i) the bearer data; (ii) the modulation frequency; and (iii) the power level; and the radio link converter unit arranged to:
receive a digital signal that defines (i) bearer data for each of a plurality of channels; and (ii) control information for each of the plurality of channels;
parse from the control information, a power level and a modulation frequency, the power level being one of a plurality of possible power levels and the modulation frequency being one of a plurality of possible modulation frequencies;
based on the power level and the modulation frequency, responsively generate an analog signal having a plurality of analog channels that defines the bearer data in the digital signal; and
transmit the analog signal to the at least one wireless terminal.

* * * * *